Figure 10:
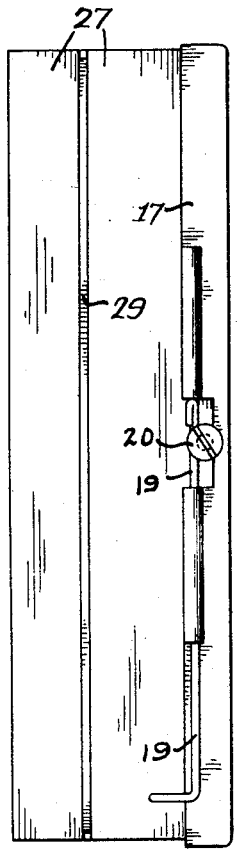

Oct. 4, 1949.  A. F. GALLISTEL, JR  2,483,578
CAMERA CUT FILM MAGAZINE
Filed Feb. 7, 1947  3 Sheets-Sheet 1
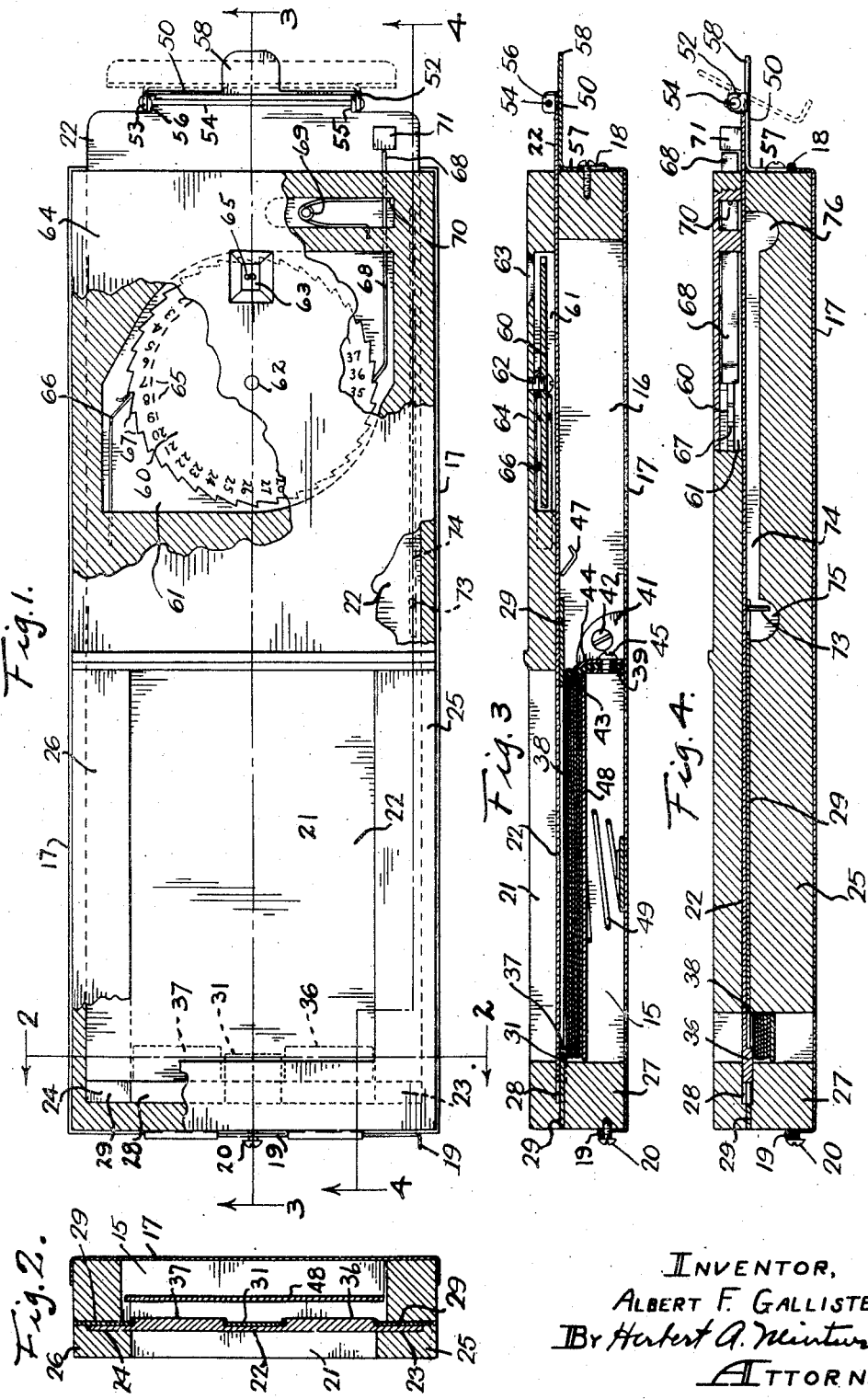
INVENTOR,
ALBERT F. GALLISTEL, JR,
By Herbert A. Minturn,
ATTORNEY.

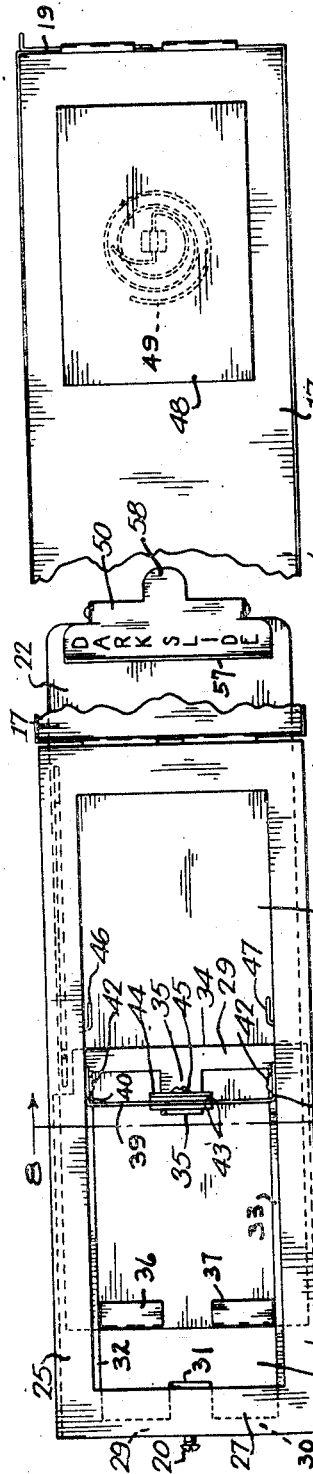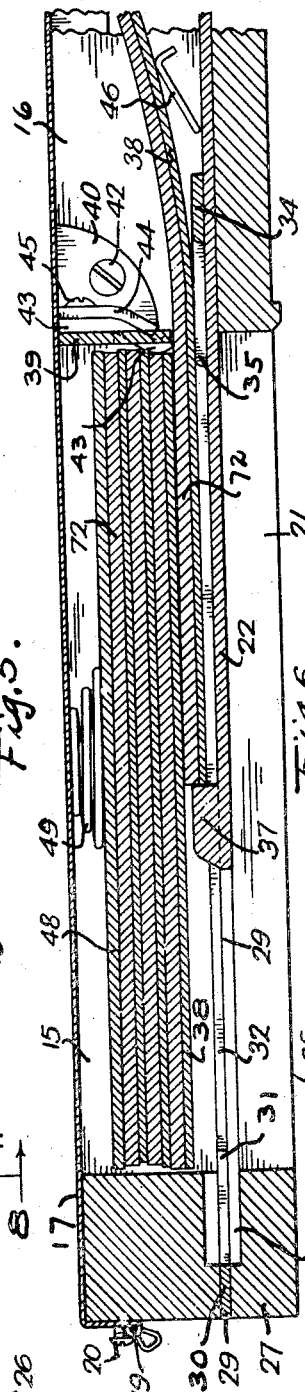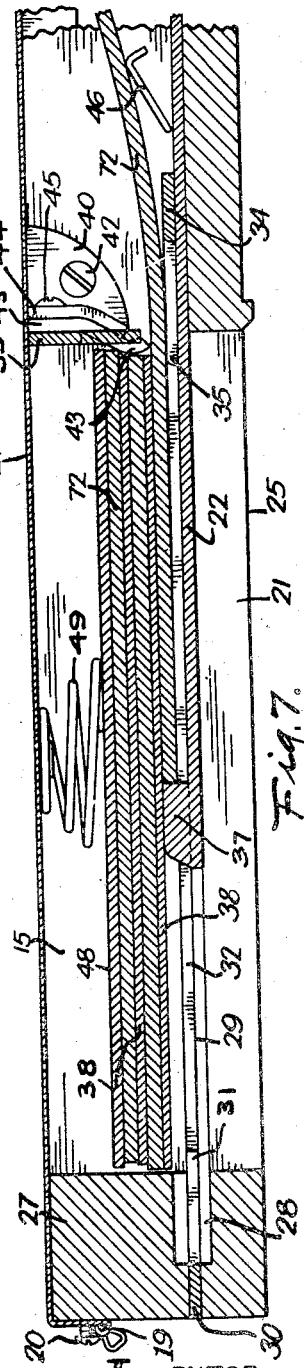

Oct. 4, 1949.  A. F. GALLISTEL, JR  2,483,578
CAMERA CUT FILM MAGAZINE
Filed Feb. 7, 1947  3 Sheets-Sheet 3

INVENTOR,
ALBERT F. GALLISTEL, JR.,
By Herbert A. Minturn,
ATTORNEY.

Patented Oct. 4, 1949

2,483,578

UNITED STATES PATENT OFFICE 2,483,578

CAMERA CUT FILM MAGAZINE

Albert F. Gallistel, Jr., Madison, Wis.

Application February 7, 1947, Serial No. 727,075

6 Claims. (Cl. 95—23)

This invention relates to an improved form of a cut film pack holder of the type insertable across the back of a camera, whereby one after another of individual cut pieces of film may be uncovered for exposure and then removed to a storage position cut off from light rays, and further, of that type wherein the holder may be removed from the camera for removal of the exposed films and charged with a new supply.

The invention possesses many advantages over the types of film holders now upon the market. One of the advantages is that the holder may carry a greater number of the cut films than has heretofore been possible while employing a film transfer mechanism that is not only positive in construction and action but extremely simple in construction and operable simply by shifting of the dark slide. Another advantage resides in the particular construction of the transfer mechanism, wherein the dark slide may be shifted to and from the film exposed position without transfer of the exposed film until that transfer may be desired. This is of particular significance in such instances where the slide is pulled outwardly to uncover the film preliminary to opening the shutter and then the operator finds that his subject has changed position or that he does not care to expose the film at that time, and then the dark slide is returned across the film.

Another advantage of the invention is found in the fact that where the pack is built up with light barriers between the individual pieces of film, and the pack is inserted into the holder with the wrong sheet in front, movement of the dark slide to the film exposed position will move only a light barrier in that initial movement without loss of more than one of the film sheets or exposures as might otherwise be the case.

A still further advantage is found in the fact that the exposure of each film is indicated by a counter which operates only upon the actual transfer of the film to the storage compartment of the holder without recording simply the number of times the dark slide may be shifted for exposing the film.

Figure 9:
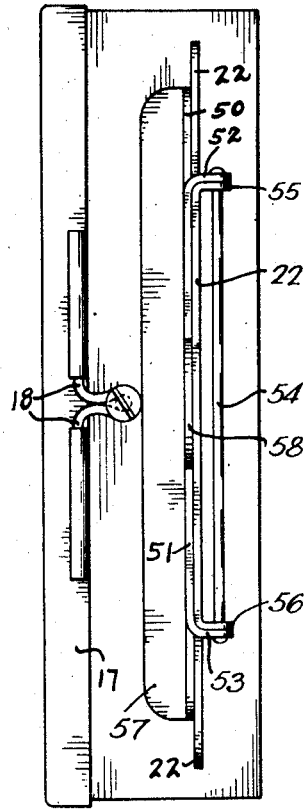
Figure 8:
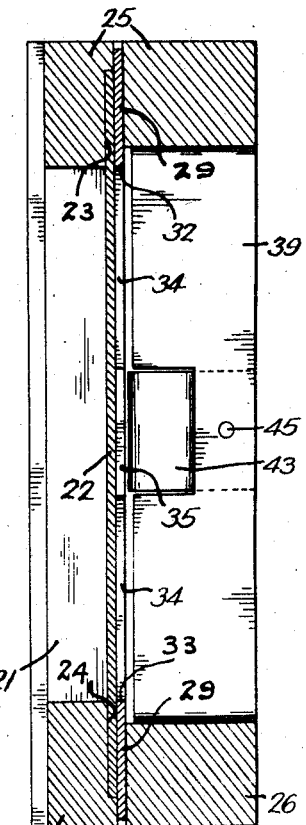

These and many other objects and advantages of the invention, including the unique combination and new associations of the various elements employed in forming the holder as set forth in the appended claims, will become apparent to those versed in the art in the following description of the invention as illustrated in the accompanying drawings, in which Fig. 1 is a view in inside or front elevation and partial section of a holder embodying the invention;

Fig. 2, a transverse vertical section on the line 2—2 in Fig. 1;

Fig. 3, a longitudinal horizontal section on the line 3—3 in Fig. 1;

Fig. 4, a horizontal transverse section on the line 4—4 in Fig. 1;

Fig. 5, a view in outside or rear elevation of the holder with the cover swung to an open position; with top and bottom edges reversed in positions from those in Fig. 1;

Fig. 6, a detail on an enlarged scale in a horizontal section toward the lower rail through the unexposed film compartment of the holder with a pack embodying light barriers between pieces of film, with the pack inserted in the proper relation to the dark slide;

Fig. 7, a view similar to that of Fig. 6 but with the film pack inserted incorrectly with a light barrier on the front side of the first film piece;

Fig. 8, a view on an enlarged scale in vertical section on the line 8—8 in Fig. 5;

Fig. 9, a view in right hand end elevation;

Fig. 10, a view in left hand end elevation; and

Figure 11:
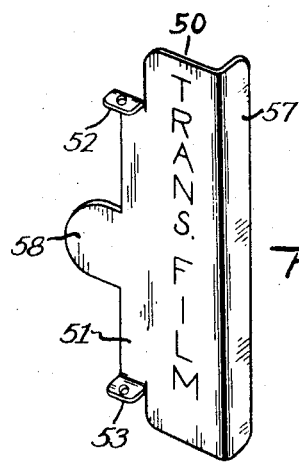

Fig. 11, a view in perspective of the dark slide shifting handle and length of travel control member.

Referring to the drawings in which like characters indicate like parts throughout the several views, I form a holder generally rectangular in shape and divided into an unexposed film pack chamber 15 and a film storage chamber 16 with a cover 17 hinged on the pin 18 at one end to swing into closed position across both chambers 15 and 16 and be releasably secured in that closed position by any suitable means, such as by the slidable pin 19 carried by the outer free end of the cover 17 to slide across on the forward side of the screw 20. The chamber 15 is normally open on its front side through the window 21.

Referring to Fig. 5, a dark slide 22, herein shown as a rectangular piece of metal, is entered through the right hand end of the compartment 16 to slide across the forward face of the compartment 16 and by its top and bottom edge portions through slots 23 and 24 provided in top and bottom rails 25 and 26 of the holder which extend respectively across the window 21. The end post 27 of the holder which unites the outer left hand ends of the rails 25 and 26 has the the vertical slot 28 to receive the end of the slide 22 therewithin. Thus, the slide 22 may be reciprocated through the holder to cover and uncover the compartment 15 by pushing the slide 22 inwardly and pulling it outwardly accordingly. Surrounding the window 21, back of the path of the slide 22 is a rectangular frame 29 across the front side of which the dark slide 22 may slide in intimate contact. This frame 29, as best indicated in Fig. 5, is, in the present form, inserted into the top and bottom rails 25 and 26 through the end post 27 to have a vertical cross bar 30 within the end post 27 and toward its outer face. From the central portion of this cross bar 30 there extends horizontally to the right a tongue 31, the forward face of which is in the plane of the front sides of the top and bottom members 32 and 33 of the frame 29. The right hand end of the frame 29 is completed by the vertical cross bar 34 and a tongue 35 extends to the left centrally from this bar 34 to have its forward face also in the plane of the members 31, 32, 33, and 34, that is, the forward sides thereof. Preferably, the left hand rear corner of the free end of the tongue 35 is rounded as indicated in Figs. 6 and 7 so that the cut pieces of the film may slide freely thereover without being stopped thereby. Thus, the rear side of the dark slide 22 in passing across the compartment 15 slides in intimate contact across these various members of the frame 29.

On the rear side of the left hand end portion of the dark slide, two abutments 36 and 37 are provided, the abutment 36 lying vertically between the frame member 32 and the path of the top edge of the tongue 31, and the abutment 37 lying vertically between the lower frame member 33 and the under edge of the tongue 31, whereby the dark slide 22 may be pushed to the left hand position to have these abutments 36 and 37 enter within the holder post 27 to permit the slide 22 to close off the window 21 entirely, such as is shown in Figs. 1-4 inclusive. The horizontal thickness of both of these abutments 36 and 37 is made to be the same and to have the rear right hand corners thereof project rearwardly from the back plane of the frame 29 a distance equal to the thickness of one only of the pieces of film 38. The horizontal lengths of these abutments 36 and 37 are made to be the same and to have the right hand edges of those abutments carried back at least into the right hand plane of the post 27 when the slide 22 is shifted into its extreme left hand position.

The compartments 15 and 16 are divided one from the other by a vertically positioned wall 39, herein shown as consisting simply of a piece of strap metal with ends 40 and 41 bent to the right and secured against the top and bottom rails 25 and 26 by any suitable means, such as by screws 42. The rear edge of this wall 39 is substantially within the plane of the back sides of the rails 25 and 26. The front edge of this wall 39 is positioned within a plane spaced rearwardly from the plane of the back side of the frame 29 a distance slightly exceeding the thickness of a film piece 38 but less than the thickness of two pieces thereof whereby one film piece only at a time may be shifted along the back side of the frame 29 forwardly of the wall 39 from the compartment 15 to the compartment 16. This shifting is accomplished by pushing the slide 22 to the extreme left hand end of its permissible travel so that the abutments 36 and 37 will, by their right hand edges, come into contact with the left hand edge of the forwardmost film piece 38 as the slide 22 is pulled outwardly in a right hand direction of travel.

Now in order to prevent undesired shifting of the forward film piece 38, means for retarding such shifting is carried by this wall 39 in the form of a friction member 43. This friction member 43 consists essentially of a length of resilient rubber clamped against the right hand side of the wall 39 by means of a plate 44 compressibly held thereagainst by a screw 45 passing through the plate 44, the rubber 43, and screw-threadedly engaging the wall 39. The forward end of this plate 44 is bent around to the left to cause the forward end portion of the rubber 43 to pass through a slot formed in and entering from the front edge of the wall 39 to have the front edge of this rubber 43 to be in the path of the film piece 38 over the tongue 35 so that as the piece 38 is carried along over the frame 29 to the right, the film is pressed toward the tongue 35 by this rubber 43. This pressure is made to be such that it is limited to that amount only as will prevent the film pieces from passing between the wall 39 and the tongue 35 when not being forcibly carried therebetween by travel of the slide 22 with the slide abutments 36 and 37 bearing against the left hand edge of the film piece 38. In other words, there is no tendency by reason of friction between the film 38 and the slide 22, or through other causes, for the film 38 to be entered under the wall 39 when transfer is not desired.

The wall 29 is spaced to the right from the inner face of the holder post 27 that distance which will permit the insertion of the pack of film pieces 38 freely within the compartment 15 with slight end play only, the clearance between the ends of the film pack and the left and right hand ends of this compartment 15 is on the order of that indicated in Figs. 3 and 4. The right hand end member 34 of the frame 29 is spaced to the right of the dividing wall 39 that distance which will permit the abutments 36 and 37 to travel past the wall 39 a sufficient distance to clear the left hand end of the film piece 38 from under the rubber 43. That is, these abutments 36 and 37 straddle the tongue 35 to effect this film travel.

As the film piece 38 is carried under the wall 39 by the abutments 36 and 37, the right hand end of the film piece 38 is lifted by reason of its top and bottom edges coming into contact with the elastic fingers 46 and 47 which are carried respectively on the under and top sides of the holder rails 25 and 26 in the present form of construction. These fingers 46 and 47 are, as indicated in the drawings, located adjacent the right hand end of the frame 29 so that by the time the left hand edge of the film piece 38 has cleared the rubber 43, the major portion of that piece 38 is entirely to the right of those fingers. Then upon left hand travel of the slide 22, the abutments 36 and 37 are carried away from the film piece 38 and transferred to the compartment 15 so that the film is then free to rock around the fingers 46 and 47, whereby the left hand edge portion of that piece 38 is relatively lifted or carried rearwardly from the frame 29. By reason of this spacing of the left hand end portion of the film piece 38 from the right hand end of the frame 29, the next film piece 38 shifted to the compartment 16 will come in forwardly of the preceding piece 38 without interference therefrom. That is, each film piece 38 transferred from the compartment 15 to the compartment 16 enters the compartment 16 forwardly of the preceding piece.

The film pack rests by the forward film piece 38 in the compartment 15 by the marginal edge of that forward piece bearing only on the top and bottom frame members 32 and 33 and the opposing ends of the tongues 31 and 35. Contact with those frame 29 members is maintained compressibly by means of a pressure plate 48 normally carried by the cover 17 through a spring 49. The normal loading operation consists simply of releasing the retaining pin 19 to rock the cover 17 around to that position as indicated in Fig. 5 whereupon the film pack is placed in the compartment 15, and then the cover 17 is returned to its closed position to have the plate 48 enter the compartment and push against the back side of the film pack by reason of the spring 49 intervening between that plate 48 and the cover 17, the cover 17 then being secured in the closed position by returning the pin 19 to its engagement with the screw 20. Normally, no light barriers are required between adjacent pieces of film 38 particularly when the correct exposure for the film employed is made so that the compartment 15 may hold a large number of pieces 38. However, a pack made up with light barrier sheets may be employed as will hereinafter be more fully explained.

On the right hand end of the slide 22 there is hinged a slide operating member 50. This member is best shown in Fig. 11. It consists essentially of a plate 51 from the top and bottom edges of which are turned ears 52 and 53 to receive a pin 54 therethrough to engage correspondingly with forwardly turned ears 55 and 56 carried by the slide 22. A flange 57 is turned from the plate 51 oppositely from the direction of the ears 52 and 53. Thus by mounting the member 50 on the slide 22 to have the ears 52 and 53 turned rearwardly with the slide ears 55 and 56 turned forwardly, the plate 51 may be swung around and into parallel contact with the backside of the slide 22 as indicated in Fig. 9. In that position, the flange 57 extends rearwardly and is spaced from the right hand end of the slide 22 a distance such that when the slide 22 is pushed to the left to bring the flange 57 into abutment with the right hand end of the holder, the film abutment members 36 and 37 are still forwardly of the front film piece 38 and have not been carried to the left beyond the left edge of that film piece and therefore these abutments 36 and 37 cannot engage with the forward film piece 38 with the slide in that limited position of travel. With the member 50 thus positioned, the slide 22 may be pulled to the right and returned to the left as often as may be desired, all without shifting the front film piece 38. In this position of the member 50, there is provided an extending tab 58 by means of which the slide 22 may be pulled outwardly and pushed backwardly without causing the member 50 to be rocked out of the position indicated. For the matter of convenience, the rear side of the member 50 when in that position is marked "dark slide" as distinguished from the marking on the reverse side of "trans. film" meaning film transfer position. When the member 50 is rocked to have that side of the plate 51 exposed to the rear carrying that marking "trans. film" then the member 50 is in a position extending to the right from the slide 22 to have the flange 57 serve as the gripping member for moving the slide 22. With the member 50 swung to this outermost position, the slide 22 may then be shifted to the extreme left hand position to carry the abutments 36 and 37 beyond the left edge of the forward film piece 38, whereby those abutments will engage with and carry along that film piece 38 upon right hand travel of the slide 22. In other words, the rockable member 50 serves as a limiting stop for selective use of the slide 22.

The member 50 is essentially designed to present a different feel and shape of the part to be grasped by the hand of the operator for each of the two operating positions of the stop. By reason of this design, the operator may readily distinguish by feel the function for which the member 50 is set without need of looking at it. This is of importance where speed of operation is desired or where the photographing of action subject matter requires the visual attention of the operator.

Now in order to indicate the number of film pieces 38 that have been transferred from the compartment 15 to the compartment 16, which transferred pieces would be those normally having been exposed, I provide a counting and indicating mechanism of a simple nature. This mechanism in the present form is shown as to consist essentially of a disc 60 mounted within a recess 61 provided in the rear wall of the compartment 16 and mounted on a horizontally disposed axle 62. A window 63 is cut through the rear wall designated by the numeral 64 so that numbers 65 may be displayed one after another through the window 63, the numeral 8 being so exposed, Fig. 1, as an example. A spring pressed pawl 66 having one end fixed in the holder and its free end resiliently bearing against the peripheral edge of the disc 60 may drop against successively presented teeth 67 provided around that peripheral portion. Then there is provided a ratchet 68 which has an end portion extending outwardly from the right hand end of the holder and an inner end resiliently bearing against the peripheral portion of the disc 60 to drop against those teeth 67. A spring 69 is carried within the wall 64 to have an end 70 extend through the ratchet 68 normally and resiliently holding the ratchet 68 in a right hand position. A lug 71 is provided on the back face of the slide 22 adjacent its right hand end to be in the path of that projecting end of the ratchet 68. The location of the lug 71 on the slide 22 is made to be such that when the member 50 is rocked to that position as indicated in Figs. 1 and 3, the lug will be adjacent the end of that ratchet 68 without causing travel thereof, but when the member 50 is rocked as indicated by the dash line positions in Figs. 1 and 4, the slide 22 may then be pushed to the left to cause that lug 71 to carry the ratchet 68 to the left a distance which will advance the disc 60 one tooth only, and then upon return right hand travel of the slide 22 the spring 69 will return the ratchet 68 slightly more than a tooth length travel for a subsequent operation. The pawl 66 prevents reverse travel of the disc 60. One numeral is provided for each tooth around the disc 60 so that each complete travel of the slide 22 to the left hand limit of travel will advance the disc 60 one tooth only.

Where it is desired that light barriers be used between adjacent film pieces 38, the only alteration required in the structure thus far described is the change in the horizontal thicknesses of the abutments 36 and 37. Referring first to Fig. 6, a film pack is made up to have on its forward side a film 38, behind which is a barrier 72 then a film piece 38 followed by a barrier 72 and so on throughout the pack. The proper placing of the pack within the compartment 15 is to first remove a barrier 72 to have the emulsion side of a front film piece 38 placed against the frame members 29, Fig. 6, as above described. In making up this pack, each light barrier strip 72 is given a thickness equal to twice the thickness of a single film piece 38. Then as indicated in Fig. 6, the abutments 36 and 37 are each given a horizontal thickness to have that portion of the abutments which extend rearwardly of the frame 29 equal to twice the thickness of a single film piece 38. Thus the abutments 36 and 37 will not only come against the left hand edge of the forward film piece 38 but will engage also the left hand end of the light barrier therebehind and carry both the piece 38 and the strip 72 on through under the wall 39, the gap forwardly of the wall 39 between it and the frame 29 being increased to permit both members to travel therethrough. Now should by accident the pack be placed in the chamber 15, Fig. 7, to have a light barrier on the forward side initially, the initial travel of the slide 22, following the first exposure, will cause the abutment members 36 and 37 to engage only with a left hand edge of that first barrier 72 and carry it on out of the way. Obviously, that exposure will be lost, but the succeeding film piece 38 will be in order for exposures thereafter. It is to be remembered that in loading the holder, the slide 22 is initially placed in that position whereby the member 50 is rocked around to the rear to have the indication "dark slide" exposed and the other indication "trans. film" concealed. Thus the first travel of the slide 22 to the right does not shift a film piece 38 but simply uncovers it for the first exposure, and this is the reason why in the incorrect loading of a light barrier containing pack, the first exposure would be lost, but that is made up by preventing loss of subsequent exposures, as would otherwise be the case if the horizontal thicknesses of the abutments 36 and 37 were not made to be as just indicated.

Means are provided to prevent left hand travel of the slide 22 between those positions wherein the slide 22 has initially been started to the right with a film engaged by the abutments 36 and 37 and that position where the film has been fully transferred to the chamber 16. Such means in the present form consist of a spring finger 73 extending rearwardly from an edge portion of the slide 22 and a slot 74 provided back of the slide, and into which slot 74 the finger 73 may be pulled by causing it to bend from its normal perpendicular position in respect to the face of the slide 22. Thus by pulling the slide 22 to the right, Fig. 4, the finger 73 is pulled along through the slot 74, inclined by its lower end to the left in such manner that reverse travel of the slide 22 to the left causes the free end of that finger 73 to dig into the floor of the slot 74 and thereby prevent that travel. At each end of the slot 74 is provided a well 75 and 76 respectively into which the finger 73 may fall and return to its normal position. The length of the slot 74 between wells 75 and 76 equals the length of the full stroke or length of travel required of the slide 22 to effect the film travel. The position of the well 75 is made to be such that there is sufficient leeway in travel of the slide 22 to permit the slide 22 to be reciprocated to and from the position of non-film engagement to permit the dark slide travel without the transfer film travel. Otherwise the slide 22 cannot be reversed in direction of travel midway between the passage of the pin 73 between the wells 75 and 76 since it will serve effectively as a stop in either direction.

While I have herein shown and described my invention in the one particular form, it is obvious that structural variations may be employed, particularly in the formation of the light holder frame and the like, without departing from the spirit of the invention, and I therefore do not desire to be limited to that precise form beyond the limitations which may be imposed by the following claims.

I claim:

1. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation.

2. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation; said film edge engaging means comprising at least one abutment extending from said dark slide toward said film and of a thickness to bear thereagainst as the slide travels across said one compartment.

3. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation; a tongue extending respectively one toward the other from each of the opposite ends of said one compartment to have film side focus thereof substantially within the plane of the film sides of said frame members; and said slide abutment being positioned to travel along respective sides of said tongues, said slide abutment extending toward said film post, said tongues a distance substantially equal to a film thickness.

4. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation; counter means for indicating number of exposed film pieces; and a counter means actuating member operated only upon said full limit of travel of said slide.

5. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation; a wall between said two compartments having a slot opening therethrough, through which opening said film piece is carried by said slide abutment; a resilient friction member carried across said wall to have a free end normally closing said opening to be yieldingly lifted by said film piece.

6. For a camera adapted to use a pack of individual films, the combination in a film holder having one compartment to receive unexposed films and a second compartment into which may be shifted exposed films, of top and bottom frame members along said one compartment, against which frame members the forward film of a pack may rest; means yieldingly urging said pack toward said members; a dark slide reciprocatably mounted to travel across the forward sides of said frame members to cover said one compartment and to travel therefrom across said second compartment; means on said slide to engage said forward film by its end edge portion farthest removed from said second compartment when said slide has been shifted to a predetermined full limit of travel covering said one compartment; and shiftable stop means carried by said slide to be shiftable to one position to permit said slide limit of travel and to be shiftable to another position to abut said holder to limit travel of the slide to cover said one compartment but less than said full limit to withhold said film edge engaging means from reaching said film edge, whereby, following the first position of said stop means, a film may be pulled along with slide travel by said engaging means to said second compartment, but in the second position of the stop means no film may be transferred regardless of slide reciprocation; a wall between said two compartments having a slot opening therethrough, through which opening said film piece is carried by said slide abutment; a resilient friction member carried across said wall to have a free end normally closing said opening to be yieldingly lifted by said film piece; and a yielding finger extending into said second compartment respectively from its top and bottom sides to be in the path of the side margins of said film piece as it travels from said wall opening, whereby the film piece is bent out of its normal plane to be urged against said friction member.

ALBERT F. GALLISTEL, Jr.

REFERENCES CITED

The following references are of record in the file of this patent:

UNITED STATES PATENTS

| Number | Name | Date |
| --- | --- | --- |
| 306,528 | Samuels | Oct. 14, 1884 |
| 402,512 | Decker | Apr. 30, 1889 |
| 424,857 | Chouteau | Apr. 1, 1890 |
| 439,013 | Kipper | Oct. 21, 1890 |
| 797,070 | Ohmer | Aug. 15, 1905 |
| 1,378,701 | Lyle | May 17, 1927 |